April 22, 1969    J. C. MEDLEY    3,439,768
HYDRAULIC DUAL SOURCE STEERING SYSTEM FOR VEHICLES
Filed Oct. 17, 1967    Sheet 1 of 2
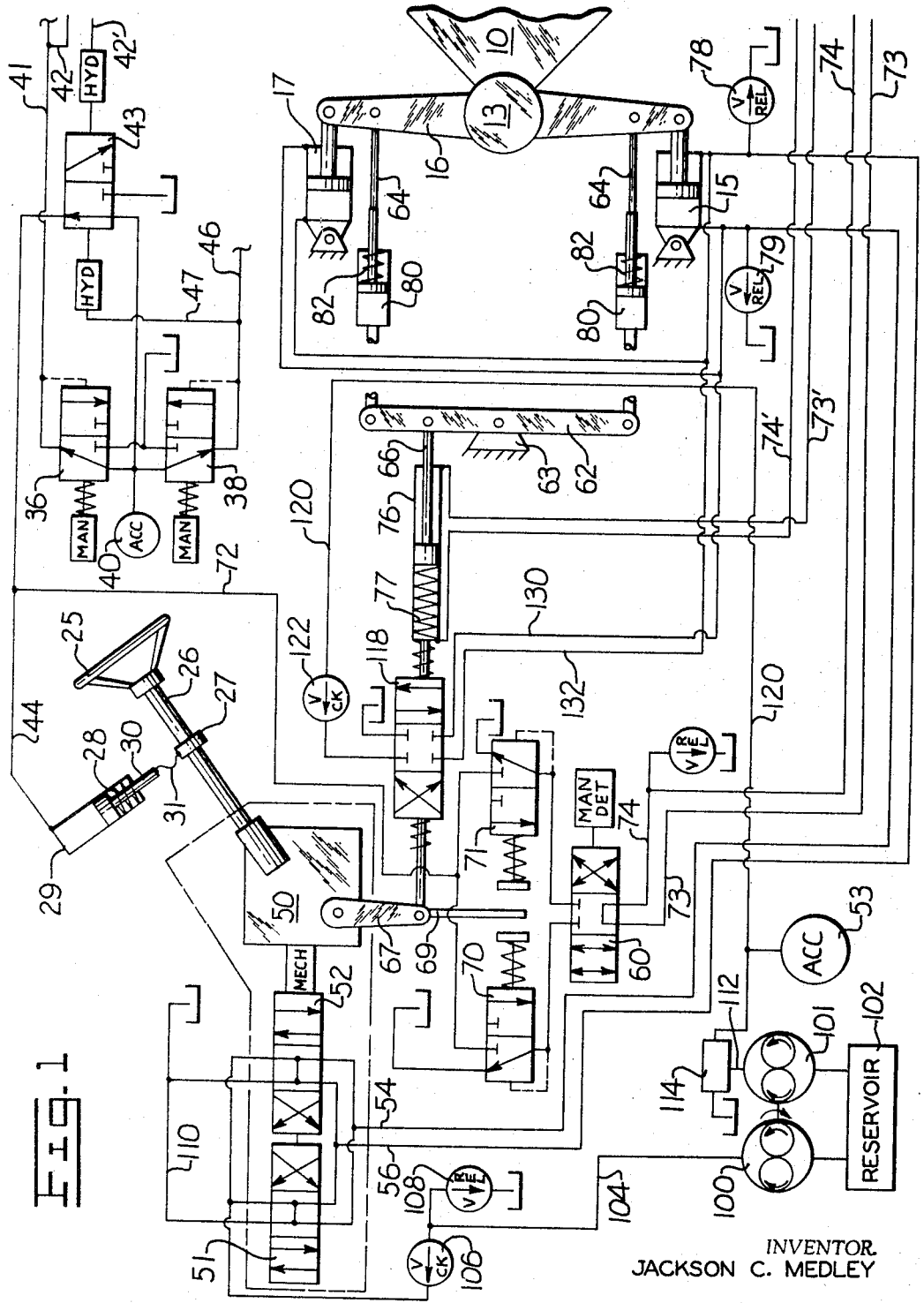
INVENTOR.
JACKSON C. MEDLEY
BY
Fryer, Tjensvold, Feix, Phillips & Lempio
ATTORNEYS

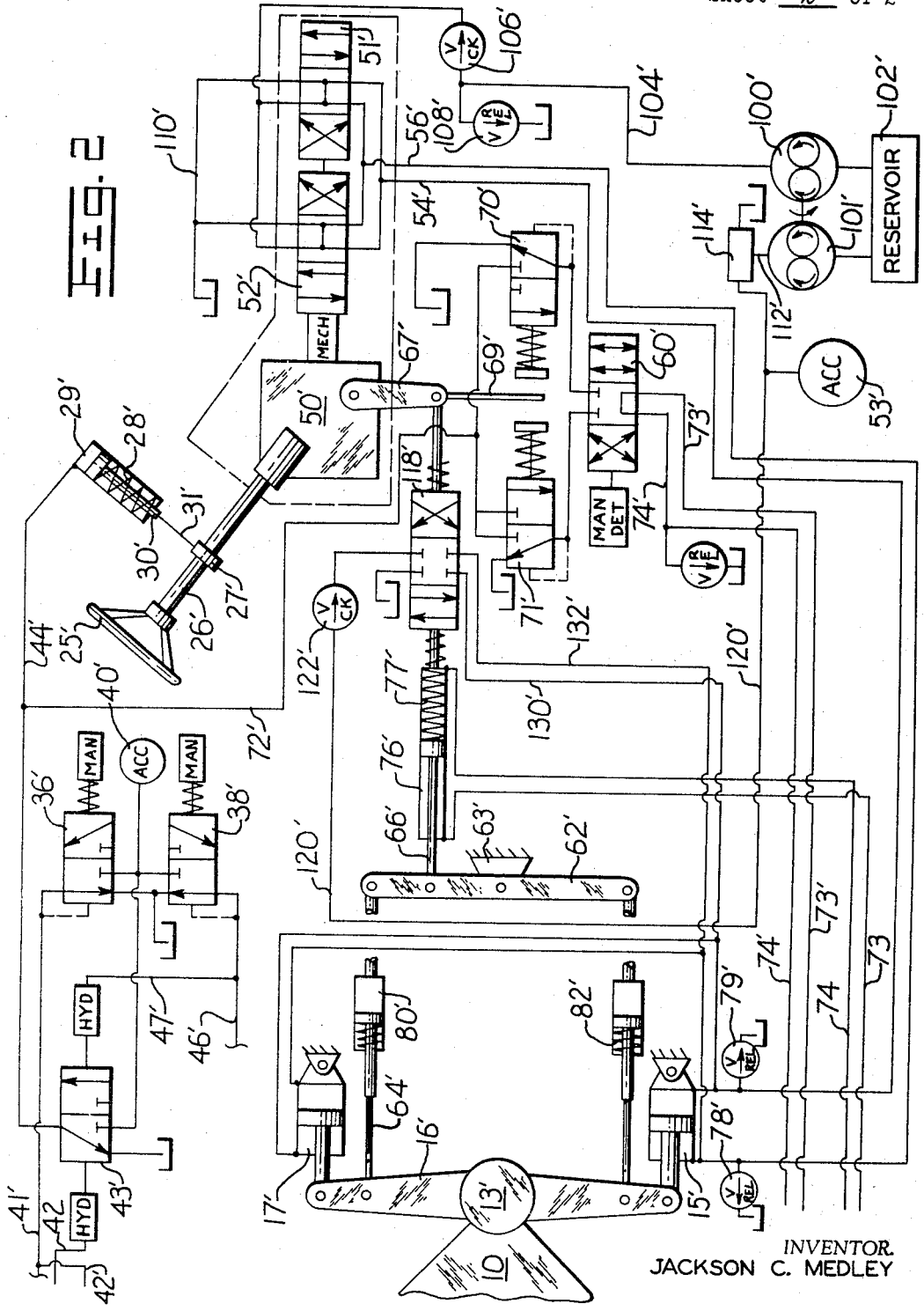

United States Patent Office 3,439,768
Patented Apr. 22, 1969

3,439,768
HYDRAULIC DUAL SOURCE STEERING SYSTEM FOR VEHICLES
Jackson C. Medley, East Peoria, Ill., assignor to Caterpillar Tractor Co., Peoria, Ill., a corporation of California
Filed Oct. 17, 1967, Ser. No. 675,966
Int. Cl. B62d 5/06
U.S. Cl. 180—79.2                                8 Claims

ABSTRACT OF THE DISCLOSURE

A dual source hydraulic steering system utilizing a pump supplied open-center steering circuit as the primary means of steering a vehicle and an accumulator supplied closed-center auxiliary steering circuit which supplements and backs up the pump circuit pressure when steering response for the vehicle is slower than that required by the vehicle operator.

---

A vehicle of the kind to which the present application is applicable is disclosed in the assignee's copending application for an invention by Jackson C. Medley et al. for "Steering System for Vehicles with Two Steerable Tractor Units," filed Oct. 23, 1965, Ser. No. 503,975, now U.S. Patent 3,390,735. The dual tractor steering and control means disclosed in the previous application is also briefly disclosed here and, where possible, similar reference characters have been used in the drawings so as to facilitate an understanding of this invention.

In both this and in the previous invention disclosure, steering of the vehicle is accomplished by changing the angle of the tractors with respect to a vehicle body which is situated between the tractors.

In the normal use of the hydraulic steering system as disclosed in the previous application, hydraulic fluid is supplied to a set of steering jacks between each tractor and the intermediate body. The fluid is supplied by either an accumulator or a pump. Occasionally it is desirable to have a back-up system for supplying additional fluid to the steering jacks. Such an occasion could arise, for example, when a heavy steering load is suddenly applied to the steering jacks.

Although the concept of a dual source of hydraulic fluid is to be incorporated in the steering control circuitry such as that disclosed in U.S. Patent 3,390,735, it does not change the basic functions of the circuit as described therein.

It is therefore an object of the instant invention to provide a dual source steering system for heavy vehicles, such as off highway trucks, in which the volumetric requirements of a hydraulic steering motor may occasionally exceed the output volume from either a conventional pump or accumulator source, thus causing inadequate steering response.

It is also an object of the present invention to provide a dual source steering system utilizing a pump-supplied open-center steering circuit as a primary means of steering and an accumulator supplied closed-center auxiliary steering circuit as a back-up means of steering.

It is a further object of this invention to provide a steering back-up system by means of which the vehicle operator of a multi-tractor vehicle may obtain the steering response he requires regardless of either the severity of the steering load or of which tractor is being utilized as the master tractor.

It is also an object of this invention to provide a steering means which will allow easier steering on the part of a vehicle operator of a heavy off-the-road type vehicle.

It is a further object of the invention to provide a dual source hydraulic steering means for a vehicle utilizing one or more hydraulic steering motors to move a steering pivot arm in apparatus wherein a mechanical follow-up and hydro-mechanical control means are employed.

It is also an object of this invention to provide a dual source hydraulic steering means wherein the sources are effectively isolated so that damage or failure of one source will not affect the other.

It is also an object hereof to provide such a steering means wherein, when a failure in the primary steering pressure source occurs, the secondary source will provide sufficient pressure to steer to a safe stop.

It is a still further object of this invention to provide a source of additional steering power to be supplied automatically in response to an operator's natural tendency to apply more turning force on the steering wheel if the vehicle is slow to respond.

Other objects of the invention will become apparent to those skilled in the art upon perusal of the following description of the preferred embodiment thereof as depicted in the drawings which are intended to illustrate but not to restrict the scope of the invention.

Referring now to the drawings:
FIGS. 1 and 2 are schematic views of the hydraulic steering and control circuit. With FIG. 1 disposed to the left of FIG. 2, the drawings show circuitry for the steering of two remotely disposed tractor units. Note that in general the circuitry shown in FIG. 2 is merely the reverse of that shown in FIG. 1 and the labels of similar parts are primed in FIG. 2. The description will, mainly, refer to FIG. 1 with suitable application to FIG. 2 being understood.

Referring now to the drawings more specifically, the vehicle disclosed comprises a body 10 supported between two tractor units by means of supporting connections or king pins shown at 13 and 13′.

Steering of the tractors relative to the intermediate body 10 is accomplished by adding or removing fluid from a pair of steering jacks 15, 17 in one tractor and, if desired, also from the steering jacks 15′, 17′ in the tractor at the opposite end of the body. Each jack is connected between the tractor frame and a bracket, as at 16, 16′, secured to and extending outwardly from the king pin cylinders 13 and 13′. Since these cylinders are secured to the body, the brackets are in effect a part of the body so that extension of one jack and retraction of the other in either of the tractors causes angular displacement of that tractor with respect to the body.

Either tractor may be used to steer the entire vehicle by means of a steering wheel 25 mounted on steering column 26. There is also mounted on the steering column a brake means 27 which, when actuated, serves to hold the steering column against movement. The brake is applied by means of a spring 28 and is released by hydraulic pressure in a cylinder 29. As shown, a piston rod 30 engages a strap or belt 31 which actuates the brake 27 when spring 28 is extended and allows the brake 27 to be released when fluid enters cylinder 29.

In the system disclosed, either tractor is automatically made to be the slave of the opposite, or master, tractor by the depression of the accelerator in the opposite tractor, while depression of the brake in either tractor automatically conditions it to act as a master tractor. This is accomplished by a valve 36 which is the accelerator valve and a valve 38 which is the brake actuating valve of the tractor. Upon depression of the accelerator pedal in the tractor of FIG. 1, the valve 36 is moved to the position shown for directing pressure from a source, here indicated as an accumulator 40, through a line 41 to the engine governor (not shown). Pressure is tapped from this line via a line 42 and directed to hydraulically actuated valve 43′ on the tractor of FIG. 2. Moving it to the position shown exhausts pressure from a steering post brake cylinder 29' through a line 44' and to a reservoir as illustrated.

Thus when an operator enters the cab of either tractor, he need not be concerned as to whether the tractor is established as a master or slave since the very act of depressing the accelerator necessary to place the tractor in motion will lock the steering wheel on the slave tractor and the steering wheel of a master tractor will be unlocked when he first applies the brakes. Consequently, if upon starting the steering wheel is found to be locked, merely touching the brakes will complete the conditioning of both tractors.

A brake valve 38 is also actuated by a pedal to move it to the position illustrated in FIG. 1 where pressure is directed through a line 46 to brake cylinders (not shown). This fluid is tapped by a line 47 to actuate the hydraulic valve 43 to the position shown to communicate pressure from the accumulator 40 through a line 44 to the steering column brake cylinder 29. Thus cylinder 29 compresses spring 28 and the brake 27 is released.

Steering is accomplished in the master system, assumed here to be that of FIG. 1, by rotation of the steering wheel 25 to adjust the mechanical steering mechanism, herein shown in a houstng 50. If the steering wheel is turned to the right by the operator, a pair of open center hydraulic valves 51 and 52 are shifted to the left as shown in FIG. 1. This causes the passage of hydraulic fluid from a pump 100 to a line 54 and therethrough to the head end of steering jack cylinder 15 and the rod end of steering jack cylinder 17. Pressure in the opposite ends of the cylinders of the steering jacks 15 and 17 is thereupon relieved through a line 56 and back through the valves 51, 52 to a sump or reservoir, as shown by passage through hydraulic line 110. Turning the steering wheel in the opposite direction adjusts the valves 51 and 52 toward the right, as shown in FIG. 1, whereby pressure from the source is directed into the line 56 causing fluid to enter the rod end of the steering jack cylinder 15 and the head end of the cylinder of steering jack 17. The opposite ends of the cylinders would thereupon be relieved of pressure by means of line 54 which again would vent to the reservoir through valves 51 and 52 and line 110.

Although the system has been shown to utilize a pair of valves 51, 52, it is obvious that, if desired, a single valve could be used which would accomplish the same function. This, of course, is a matter of choice of design which is within the skill of the art.

Pump 100 is the primary source of fluid for the steering system and supplies the steering control valves 51 and 52 with hydraulic fluid by means of line 104. A check valve 106 is used in this line to prevent hydraulic fluid from returning from the steering circuit to the pump circuit in the event of failure in the pump circuit, and serves as a means of isolation. A relief valve 108 is also used in line 104 as a protective feature for the pump and the steering lines in the event a wheel encounters an obstruction, thereby applying an external force exceeding the maximum power force available in the hydraulic steering circuit.

Circle and crab steering of the two tractors may be accomplished by shifting valve 60 in the proper direction as explained in U.S. Patent 3,390,735. This causes a passage of hydraulic fluid through lines 73 and 74 to the proper ends of steering link cylinder 76' shown in FIG. 2.

Circle steering is accomplished, for example, by shifting valve 60 toward the right as shown in FIG. 1 and is controlled by the vehicle follow-up mechanism. This follow-up mechanism includes a rocker arm shown at 62 pivotally supported at its center in a bracket 63 on the tractor and having its opposite ends connected by means such as cables 64 with the arms of bracket 16 to which the jacks 15 and 17 are connected. The cables 64 may be considered for this purpose as being non-resilient, despite the presence of cylinders 80 shown therein. Upon turning movement of the tractor relative to the arms 16 which are fixed with respect to the body 10, the rocker arm 62 will pivot about its center support and, through a link 66, will actuate a lever 67 thereby adjusting the steering mechanism in housing 50 to neutral. This causes the valves 51 and 52 to be returned to the neutral position so that, when turning of the steering wheel 25 is discontinued, steering action will stop. For these purposes, the link 66 may also be considered as a rigid link having a fixed length.

When the steering wheel 25 is actuated, an extension 69 of the lever 67 engages either of two valves 70 or 71 to move that valve from the position illustrated to a position wherein pressure from a source line 72, fed by accumulator 40, is directed to either line 73 or 74.

With valve 60 shifted to the right, steering of the master tractor will cause pressure to be directed to the head end of cylinder 76' which forms a part of the link 66'. This cylinder contains a spring 77' stiff enough normally to cause the link 66' to act as a rigid member. However, upon introduction of pressure to either end of the cylinder, the link 66' is, in effect, extended or retracted to impart swinging motion to follow up lever 67'. Since the steering post 26' is held against rotation, the steering mechanism within housing 50' will impart movement to the steering valves 51', 52'. Thus, steering jack 15' and 17' on the slave tractor will be energized.

Crab steering may be accomplished in a similar manner by shifting valve 60 to the left as shown in FIG. 1.

Should the wheels of the slave tractor strike an obstruction such as a large rock, excess pressure in the steering cylinders 15' and 17' could be relieved through a relief valve such as shown at 78' and 79'. This would cause a variation in steering, but rocker arm 62' of the follow-up mechanism would also move imparting movement to the follow-up lever 67' which in turn would adjust the steering valves 51', 52' to cause makeup of fluid in the steering jacks 15' and 17' until the tractor is immediately returned to its course.

As disclosed in the assignee's previously assigned application entitled, "Hitch for Heavy Duty Hauling Vehicles," Ser. No. 503,038, filed Oct. 23, 1965, now U.S. Patent 3,363,916 the body 10 may be capable of being raised and lowered with respect to the tractors and the cylinders 13 move upwardly with the body. If so designed, this causes a change in the distance between the lever arm 16 on the cylinder 13 and the ends of the rocker arm 62. Extensible units in the form of cylinders 80 with springs 82 urging them to a retracted position must therefore be included in the cables 64 if the system utilizes the design. Thus both cables will always be equal in length but may be extended due to the greater force applied upon upward movement of the body with respect to the tractor.

The system of steering described above is a complete and adequate system under normal operating conditions. In such a system, the unit described as pump 100 could obviously be replaced with an accumulator such as shown in U.S. Patent 3,390,735 wherein a closed center steering valve is utilized. Where the volumetric requirement of the steering motors may occasionally exceed the output capability of either a conventionally sized pump or accumulator, an inadequate steering response may result.

When the steering valves 51 and 52 are of the open center type, a pump supplied with fluid from a sump or reservoir passes the fluid through an open center steering circuit which is backed up by an accumulator supply closed-center auxiliary circuit. The auxiliary circuit is active only when slow steering response causes a force exceeding that associated with the normal steering to be exerted on the follow-up linkage between the steering pivot arm and primary steering gear and valve assembly.

Referring once again to FIG. 1, the pump mechanism is shown schematically to consist of two pumps, 100 supplying the primary circuit and 101 supplying the auxiliary back-up circuit. Although a two-pump system may be used as shown, it is also possible to use a two-vane engine driven pump to supply both circuits. As shown, both pumps take suction from a common reservoir 102.

Pump 101 is normally used for accumulator charging purposes only. As shown, the output of the pump 101 to conduit 112 is directed through an accumulator charging valve 114 for charging of the accumulator 53. Pump output, in excess of the requirement of the circuits connected to the accumulator 53, is returned to the reservoir. The output of accumulator 53 is connected to a closed centered steering valve 118 through a conduit 120 and a check valve 122. The check valve 122 isolates the steering circuit from the accumulator circuit so that damage to the accumulator circuit cannot result in loss of fluid volume output from the primary steering pump 100 which might otherwise effect the function of the primary steering circuit. Thus the check valves 122 and 106 effectively serve to isolate the primary steering circuit from the auxiliary steering circuit even though, at times, both are supplying fluid to the steering motors 15 and 17.

The closed center steering valve 118 is spring centered into its closed position as shown and is mechanically inserted in the follow-up linkage in series with the cylinder 76. As previously described, the follow-up linkage 66 is connected between the steering mechanism positioned by the steering jacks 15 and 17 and the pitman arm 67 of steering gear 50 such that once the desired steering attitude has been effected by motion of the steering jacks, the pitman arm will be moved to close the primary steering valves 51 and 52. This, of course, terminates steering motion.

For normal steering operations, the construction of the steering follow-up cylinder 76 and the strength of the centering springs of valve 118 are such as to effectively render the follow-up linkage a rigid member. This feature is important when related to the steering control of the slave tractor, since the follow-up cylinder 76 changes length in response to pilot pressure from a steering system of the control tractor or master tractor to effect steering control of the slave tractor.

When the turning motion of the master vehicle is not rapid enough to suit the operator, his natural tendency is to apply more turning force to the steering wheel 25, thereby attempting to increase the speed of steering motion. This causes steering valves 51 and 52 to be open fully in the event the volume from pump 100 is insufficient to cause adequate steering response. Such additional steering force exerted on the wheel 25 and steering gear 50 will be transmitted to the pitman arm 67 to cause it to exert a force on the follow-up linkage. This force will overcome the centering springs of the valve 118 and cause it to communicate fluid through check valve 122 to the appropriate steering line 130 or 132 to augment the flow from pump 100 to the steering jacks. Movement of the valve 118 to the left as shown in FIG. 1 will communicate accumulator fluid to line 132 so as to aid a steering motion of the tractor to the left. Movement of the valve rightwardly will connect the accumulator source to line 130 so as to aid in steering to the right.

The above condition of dual source steering of course assumes that the required steering system pressure for providing adequate oil volume to the steering cylinders does not exceed the release setting for the accumulator circuit. In any event if the pressure existing in the steering circuit, including the steering jacks and lines 130 and 132 leading thereto, is in excess of the relief setting of the accumulator the check valve 122 would remain seated so that none of the fluid supplied by the steering pump 100 could return through the actuated valve 118 to the accumulator circuit.

Steering of the slave tractor is accomplished by lengthening or shortening the follow-up link 66' by changing the relative position of the cylinder and piston 76'. This in turn exerts a force on pitman arm 67'. Since steering column 26' is fixed against movement by brake means 27', the motion of pitman arm 67' will cause an opening of valves 51' and 52' in the proper direction. Steering motion of the rear tractor must be translated through the follow-up arms 62' and follow-up linkage 66' to the pitman arm 67' to move the valves 51' and 52' back to center to stop the steering at the proper time. If the steering oil pressure available on the slave tractor is so low that steering response is slow, the cylinder 76', in attempting to attain the length proportional to the pressure applied to it, will continue to exert a force on pitman arm 67' until valves 51' and 52' are fully open and the arm 67' is at the limit of its travel. At this time the external force exerted on the follow-up linkage of the slave tractor between the pivot arm and the pitman arm acts to prevent the follow-up cylinder 76' from attaining a length proportional to the pressure and volume of pilot oil supplied to it. This in turn results in a pressure build up in cylinder 76'. The added internal pressure will exert a force sufficient to overcome centering springs of valve 118', causing it to communicate accumulator oil to the jacks 15' and 17', thereby augmenting the pump steering supply on the slave vehicle to increase the rate of steering response therein.

It should be noted that when valve 60 is in the center or closed position no steering force whatever is transmitted to the slave vehicle. In effect, the vehicle may be considered as a single vehicle steering system. Therefore, the system herein disclosed could be used on a steering system which does not utilize a plurality of tractors. Obviously, of course, in such a case valves, such as 60, 70 and 71, their associated lines, check valves, etc., would not be required. Also this system could be used in a steering system utilizing only one jack, 15 or 17, rather than both.

Thus the applicant has disclosed a vehicle steering system wherein the volume of hydraulic fluid is augmented by an accumulator source in the event faster steering response is required in response to the operator's natural tendency to apply more turning force on the steering wheel if an operator controlled vehicle is slow to respond. If either circuit should fail, the systems are checked off in such a manner that the other circuit would not be effected. Further in the event of failure of the primary supply pump, the vehicle could still be steered to a safe stop using the back-up system and if the vehicle engine or the pump driven engine should fail in operation, the accumulator would still provide power for steering until the vehicle could be safely stopped.

I claim:

1. In a vehicle comprising a body and a tractor, a steering system controlled by a steering means and comprising a hydraulic jack means between said tractor and said body for pivoting said tractor relative to said body, a primary hydraulic circuit in said tractor for supplying fluid to said hydraulic jack means, a mechanical follow-up means in said primary hydraulic circuit and fixed to said steering means whereby fluid passage to said hydraulic jack means is stopped when the desired degree of relative pivoting between said tractor and said body is achieved, a valve means in said follow-up means and controlled by actuating means in said follow-up means when the vehicle steering pressure requirements are greater than said primary hydraulic circuit can supply, and a back-up hydraulic circuit in said vehicle, of which said valve means is a part, whereby said back-up hydraulic circuit augments the pressure supplied by said primary hydraulic circuit when said valve means is actuated by said actuating means.

2. The vehicle of claim 1 wherein said valve means comprises a spring-centered valve mounted between said hydraulic jack means and said follow-up means.

3. The vehicle of claim 2 wherein said spring-centered valve is moved by said actuating means in a direction dependent upon the direction of movement of said steering means.

4. The vehicle of claim 2 wherein a tractor utilizing such a steering system is mounted at each end of said body, and means hydraulically interconnect said tractors whereby actuation of a shiftable valve in said interconnect means in one of said tractors to one of three positions causes the other of said tractors to be fixed against steering, to steer in the opposite direction from that of said one of said tractors, or to steer in the same direction as said one of said tractors when said steering means in said one of said tractors is actuated.

5. The vehicle of claim 4 including means for locking the said steering means in said other of said tractors and means whereby said follow-up means in said other of said tractors controls both said primary and said back-up hydraulic circuits therein when said locking means is actuated and the steering means of said one of said tractors is actuated.

6. The vehicle of claim 2 wherein a tractor utilizing such a steering system is mounted at each end of said body, and means hydraulically interconnect said tractors whereby actuation of said steering means in one of said tractors causes the other of said tractors to steer in the same direction, the opposite direction, or only one tractor to be steered while the other is held fixed relative to said body.

7. The vehicle of claim 6 including control means interconnecting said tractors whereby actuation of said control means in one of said tractors causes said one of said tractors to become the master tractor and the other of said tractors to become the slave tractor.

8. The vehicle of claim 6 including hydraulic means in said follow-up means for expanding or contracting said follow-up means in response to a steering signal from the tractor at the opposite end of said body, whereby said back-up hydraulic circuit may supplement said primary hydraulic circuit when said valve is actuated, regardless of which of said tractors is the master tractor.

References Cited

UNITED STATES PATENTS

| | | |
|---|---|---|
| 2,614,644 | 10/1952 | Gustafson. |
| 3,014,548 | 12/1961 | Donner et al. |
| 3,083,533 | 4/1963 | Schenkelberger ___ 180—79.2 X |
| 3,305,039 | 2/1967 | Molby. |

LEO FRIGLIA, *Primary Examiner.*

JOHN A. PEKAR, *Assistant Examiner.*

U.S. Cl. X.R.

60—52